(12) United States Patent
Boehm et al.

(10) Patent No.: US 8,977,608 B2
(45) Date of Patent: Mar. 10, 2015

(54) VIEW LIFE CYCLE MANAGEMENT

(75) Inventors: Thilo Boehm, Heidelberg (DE); Martin Mueller, Walldorf (DE); Maic Wintel, Walldorf (DE)

(73) Assignee: SAP SE, Walldorf (DE)

( * ) Notice: Subject to any disclaimer, the term of this patent is extended or adjusted under 35 U.S.C. 154(b) by 223 days.

(21) Appl. No.: 12/962,586

(22) Filed: Dec. 7, 2010

(65) Prior Publication Data

US 2012/0143848 A1 Jun. 7, 2012

(51) Int. Cl.
*G06F 17/30* (2006.01)
*G06F 7/00* (2006.01)

(52) U.S. Cl.
CPC .................. *G06F 17/30383* (2013.01)
USPC ............ 707/722; 707/736; 707/803

(58) Field of Classification Search
USPC .................................. 707/722, 723
See application file for complete search history.

(56) References Cited

U.S. PATENT DOCUMENTS

| | | | | |
|---|---|---|---|---|
| 5,465,362 A | * | 11/1995 | Orton et al. | 718/107 |
| 5,524,199 A | * | 6/1996 | Orton et al. | 715/790 |
| 5,561,793 A | * | 10/1996 | Bennett et al. | 707/999.201 |
| 5,737,559 A | * | 4/1998 | Orton et al. | 715/807 |
| 5,802,326 A | * | 9/1998 | Becker et al. | 715/854 |
| 5,991,776 A | * | 11/1999 | Bennett et al. | 707/999.205 |
| 7,467,128 B2 | * | 12/2008 | Larson et al. | 707/999.002 |
| 7,733,954 B2 | * | 6/2010 | Alexandre et al. | 375/240.01 |
| 2006/0195914 A1 | * | 8/2006 | Schwartz et al. | 726/32 |
| 2008/0005197 A1 | * | 1/2008 | Chang et al. | 707/204 |
| 2008/0120129 A1 | * | 5/2008 | Seubert et al. | 705/1 |
| 2008/0162720 A1 | * | 7/2008 | Gulati et al. | 709/238 |
| 2010/0049734 A1 | * | 2/2010 | Wintel et al. | 707/103 R |

* cited by examiner

*Primary Examiner* — Pavan Mamillapalli
(74) *Attorney, Agent, or Firm* — Mintz Levin Cohn Ferris Glovsky and Popeo, P.C.

(57) ABSTRACT

The subject matter disclosed herein provides, methods and apparatus, including computer program products for the management of a view of a data structure. In one aspect, there is provided a method that may include generating a view of a data structure. The data structure and the view may include a plurality of nodes and at least one association. This method may further include determining, at run time, whether the generated view is invalid based on an indicator. The indicator may represent whether a change has occurred to a system including the view. This method may further include deleting, at run time, the view based on the results of the determining. Related apparatus, systems, techniques and articles are also described.

16 Claims, 7 Drawing Sheets

VIEW LIFE CYCLE MANAGEMENT

TECHNICAL FIELD

The subject matter described herein relates to the life cycle management of data.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, an enterprise resource planning software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

As part of the installation process of the core software platform on computing hardware owned or operated by the organization, one or more customized features, configurations, business processes, or the like may be added to the default, preprogrammed features, such that the core software platform is customized for maximum compatibility with the organization's business processes, data, and the like.

The core software platform of an enterprise resource planning software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Smaller organizations can also benefit from the use of ERP functionality. However, such an organization may lack the necessary hardware resources, IT support, and/or consulting budget necessary to make use of a standalone ERP software architecture product and can in some cases be more effectively served by a software as a service (SaaS) arrangement, in which the ERP system architecture is hosted on computing hardware such as servers and data repositories maintained remotely from the organization's location and accessed by authorized users at the organization via a thin client, such as for example a web browser over a network.

Many modern business software systems, including ERP software systems can be built upon business objects. Business object refers to a data structure including at least one of data and a method. The business objects are often represented graphically using nodes, which are associated (or linked) with one another.

SUMMARY

In one aspect, there is provided a method. The method may include generating a view of a data structure comprising a plurality of nodes and at least one association; determining, at run time, whether the generated view is invalid based on an indicator, the indicator representing at least whether a change has occurred to a system including the view; and deleting, at run time, the view based on the results of determining.

In some implementations, one or more of the following features disclosed herein and/or noted below may be included. The view may represent the data structure, and may be configured to be mapped to at least one query parameter for querying the data structure. The association may comprise at least a join. The indicator may comprise a time stamp. The change to the system may comprise at least one of an upgrade to the system and a modification to an aspect of the system. Another view may be generated at run time to replace the view, when the view is deleted at run time based on the indicator. The data structure may be stored in shared memory. The data structure may be stored in a first portion of shared memory when the data structure corresponds to a specific tenant and in a second portion of shared memory when the data structure corresponds to multiple tenants.

Articles of manufacture are also described that comprise machine executable instructions permanently stored on machine readable media (e.g., non-transitory computer readable media), which, when executed by a machine, causes the machine to perform the operations described herein. Similarly, computer systems are also described that may include a processor and a memory coupled to the processor. The memory may temporarily or permanently store one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

In some implementation, a search engine may be accessed by a fast search infrastructure (FSI) system. The fast search infrastructure system may include a query service provider to form and dispatch queries to the search engine (or to an index of the search engine). The fast search infrastructure system may implement a model-based approach to define the query implemented by the query service. Specifically, a view may be used to represent an abstract view of the data structure, such as business object nodes. The view may allow a query request to be formed based on a model of the data structure. For example, the query request may be generated based on the business object nodes, and then the generated query request is dispatched to a search engine or its corresponding index. Moreover, the index may also include attributes based on the data structure/business object nodes. Thus, the use of views enables, in some implementations, enhanced queries.

Figure 1A:
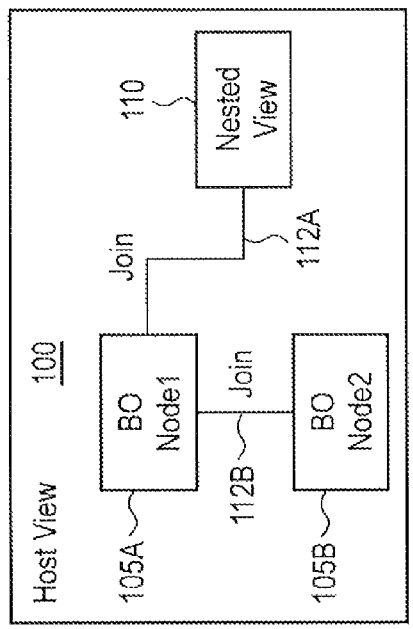
FIG. 1A depicts an example of a view.

FIG. 1A depicts an example of a view 100. The view 100 includes an abstract representation of a data structure, such as business object nodes 105A-B, a nested view 110 (to enable view 100 to be nested into one or more other views), and associated links 112A-B (labeled as a "Join," although other relationships between the nodes may also be used as links).

Figure 1B:
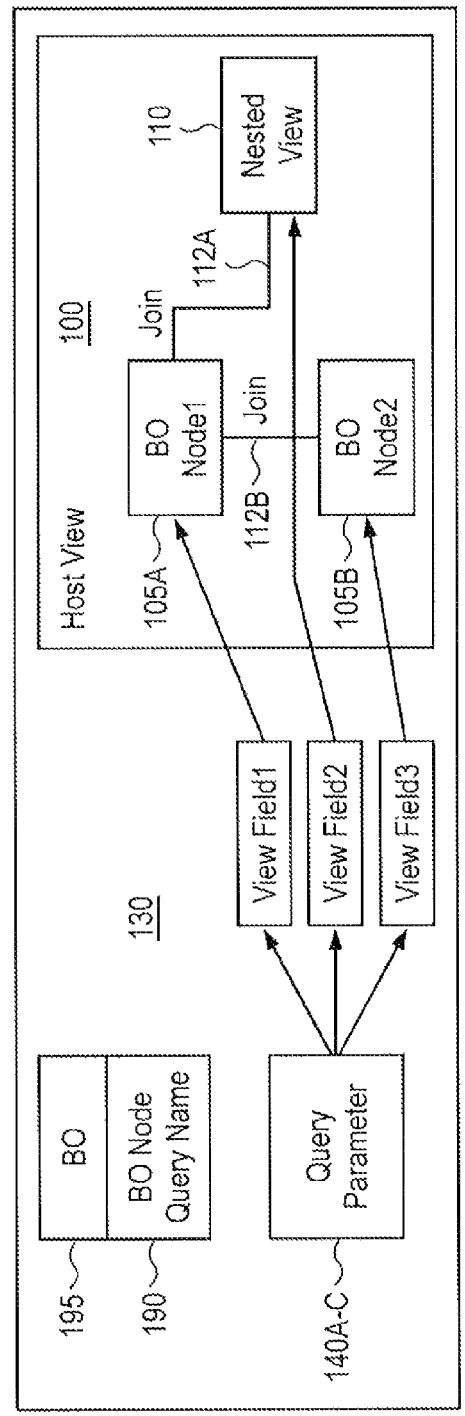
FIG. 1B depicts a view mapped into query parameters.

FIG. 1B depicts the view 100 mapped 130 into query parameters 140A-C used in a query request to a search engine and/or an index to be searched. The query parameters 140A-C are associated with a query name 190 to identify the query and the corresponding business object (and nodes) 195.

Once defined (e.g., during design time), the view 100 may be used to identify the data structure, such as the business object nodes, used to define the query request. During run time, the query requests are dispatched to the search engine (and/or an index) via a query service provider. For example, the view 100 describes the search behavior of the query request by defining which business object nodes are implicated in the query and how the business object nodes are associated, such as via links 112A-B. In some implementations, these modeled (i.e., defined) views may also be used to create, manage, and/or search a logical search index associated with the search engine to enable index-based searches.

In some implementations, a significant quantity of views may be predefined for a user and/or defined by the user. For example, when deployed, a system may include hundreds if not thousands of predefined views. However, not all of the views may be used by a given user. This is exacerbated in a multi-tenant environment (described further below with respect to FIGS. 6-7) in which a system hosts multiple users. Indeed, these created, but unused, views impact cost and performance (e.g., memory consumption). The subject matter described herein relates to the life cycle management of views. In some implementation, the subject matter described herein may provide life cycle management of views, when needed (e.g., on demand, during run time, and the like).

Figure 2:
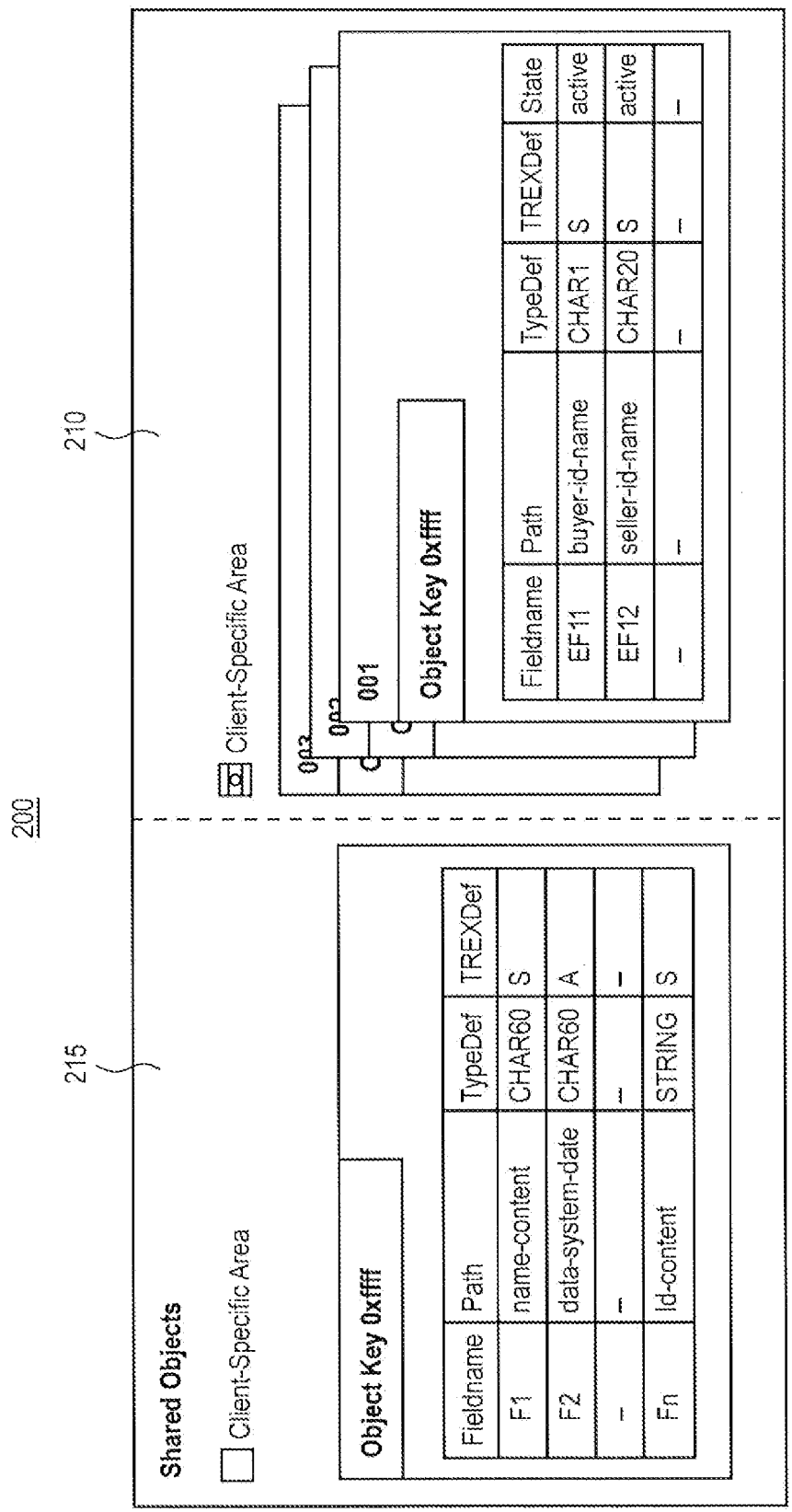
FIG. 2 depicts shared memory.

In some implementations, the views are stored in shared memory 200 depicted at FIG. 2. Shared memory 200 refers to a memory area on, for example, an application server, which is accessible by one or more programs. In some implementations, shared memory 200 is implemented in at least one of cache, random access memory (RAM), and the like. Moreover, the shared memory 200 may include objects, such as business objects.

In some implementations, when a new attribute is added to a business object, a corresponding change may be required in a view (as well as the corresponding query parameters), and, as a consequence, some of the data and/or metadata associated with the view may change. These changes may be made to data specific to a client, such as a client specific area 210 of shared memory 200, and data that is not specific to a client, such area 215 of shared memory 200. In a multi-tenant environment, each tenant may have a corresponding client-specific area in shared memory. To illustrate, area 215 may store data correspond to business objects associated with core-data for an enterprise resource planning system, while area 210 stores business objects customized to a given customer. In some implementations, an indication (e.g., an extension) may be used to distinguish between core, non-client specific business objects in area 215 and client specific business objects stored in 210. When this is the case, during run time, the core objects of area 215 may be instantiated, and if an extension is available (indicating that client-specific objects are in client specific area 210), the client-specific shared area 210 is accessed and the corresponding content of client-specific shared area 210 is added to the core objects of area 215.

Figure 3:
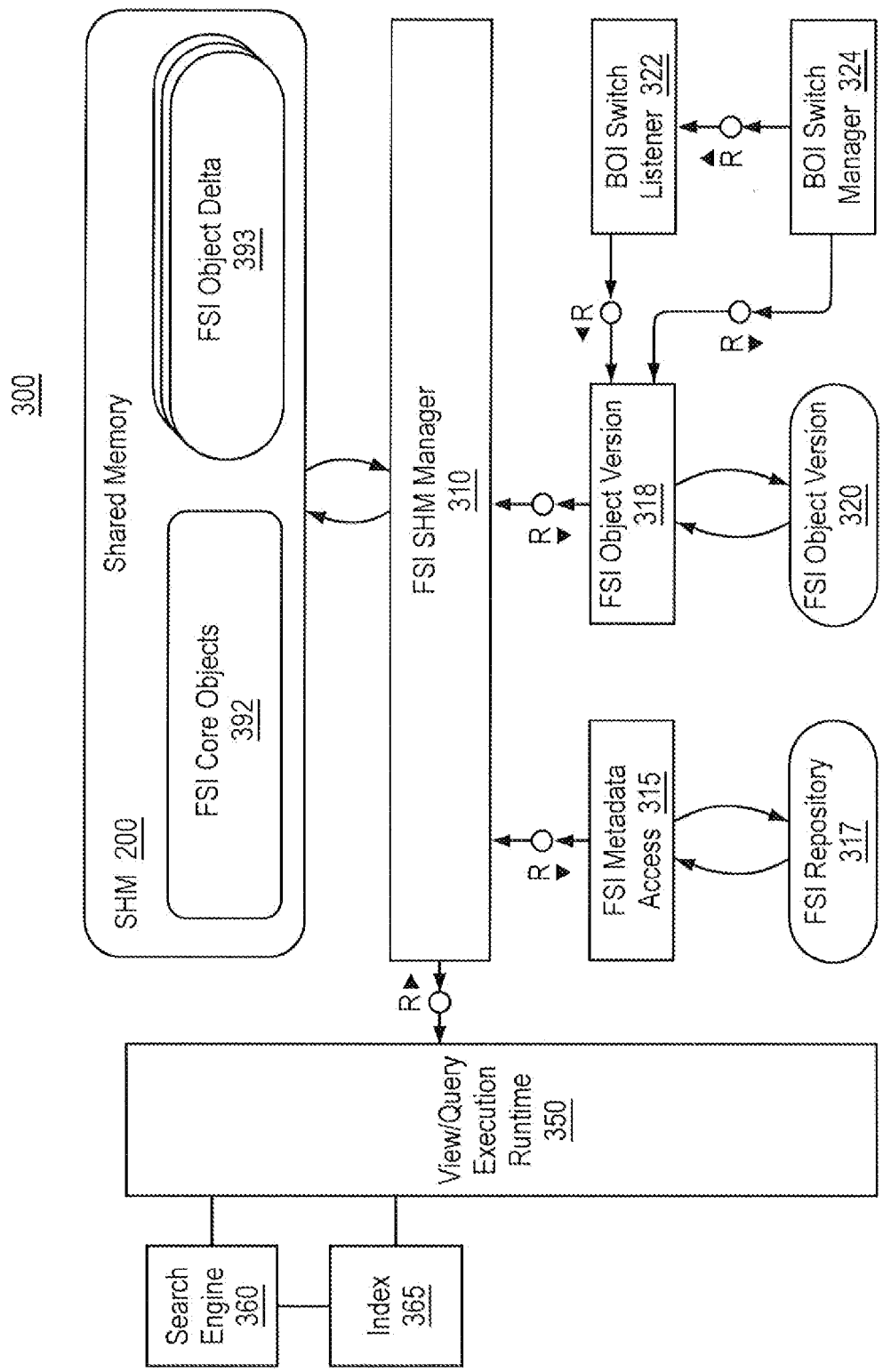
FIG. 3 depicts an example system including shared memory.

FIG. 3 depicts a system 300 including shared memory 200. The system 300 may be implemented as part of a fast search infrastructure comprising shared memory 200, a shared memory manager 310, metadata access 315 coupled to a repository 317 including metadata, object version interface 318 coupled to object version 320, a switch listener 322, and a switch manager 324. The system 300 further includes a view/query execution run time 350 which may include a view generator (for generating the views described herein). The view/query execution run time 350 may be coupled to a search engine 360 and a search index 365.

The shared memory 200 depicted at FIG. 3 consists of two parts, a cross-client part (labeled core objects) 392 and a client-specific part (labeled object delta) 393. The cross-client part represents objects which are core objects used by multiple, if not all clients. The client-specific part 393 represents extensions to the core objects. These extensions (also referred to as deltas) are objects which are provided to extend accommodate the needs of specific clients. An object delta 393 might emerge from a customer specific enhancement or upgrade of a core object 392 stored in shared memory 200. For example, suppose a customer uses a view (e.g., a fast search infrastructure view) to search for sales orders but an additional field is needed to fulfill specific business needs of that customer. In that example, the object for the additional field is considered a delta, or extension, stored in shared memory 200. The object delta 393 is stored in the client-specific part 393 of the shared memory 200 to ensure that the object delta 393 is visible only to a specific customer.

The metadata at repository 317 may include information describing the one or more views of system 300, the business objects, and/or the index 365 being queried.

The object version interface 318 provides access to object version 320, which tracks any changes to the one or more views. For example, when a service pack or other change is implemented impacting business objects and/or views, the object version 320 tracks the corresponding change to the views.

The switch listener 322 and a switch manager 324 track whether an extension indicating whether data is shared, such as shared core data, or is specific to a client, i.e., client-specific data. In some implementations, the shared memory manager 310 accesses switch listener 322 and object version 320 to determine whether a change has occurred to a view, which may require invalidating the view as described further below.

The shared memory manager 310 provides the view/query execution run time 350 with access to objects (e.g., views, view-extensions, etc.) in shared memory 200. The shared memory manager 310 also moves objects that are needed during run time into the shared memory 200 by reading the objects from a repository 317 via metadata access 315. The version information of the objects is accessed by the shared memory manager 310 via the object version interlace 318, which reads the version information from the object version 320. Each access request by the shared memory manager 310 is checked to determine whether the current version of an object in shared memory is valid or not using, for example, a version-timestamp associated with the shared memory 200. If not valid, the shared memory 200 is re-built. For example, a change (e.g., a customer enhancement, a software upgrade, etc.) may result in the shared memory manager 310 invalidating one or more objects in the shared memory 200 by increasing the version timestamp. When this is the case, accessing a view via the shared memory 200 with an obsolete version timestamp triggers a rebuild of a new run time object, which is returned to shared memory 200.

Figure 4:
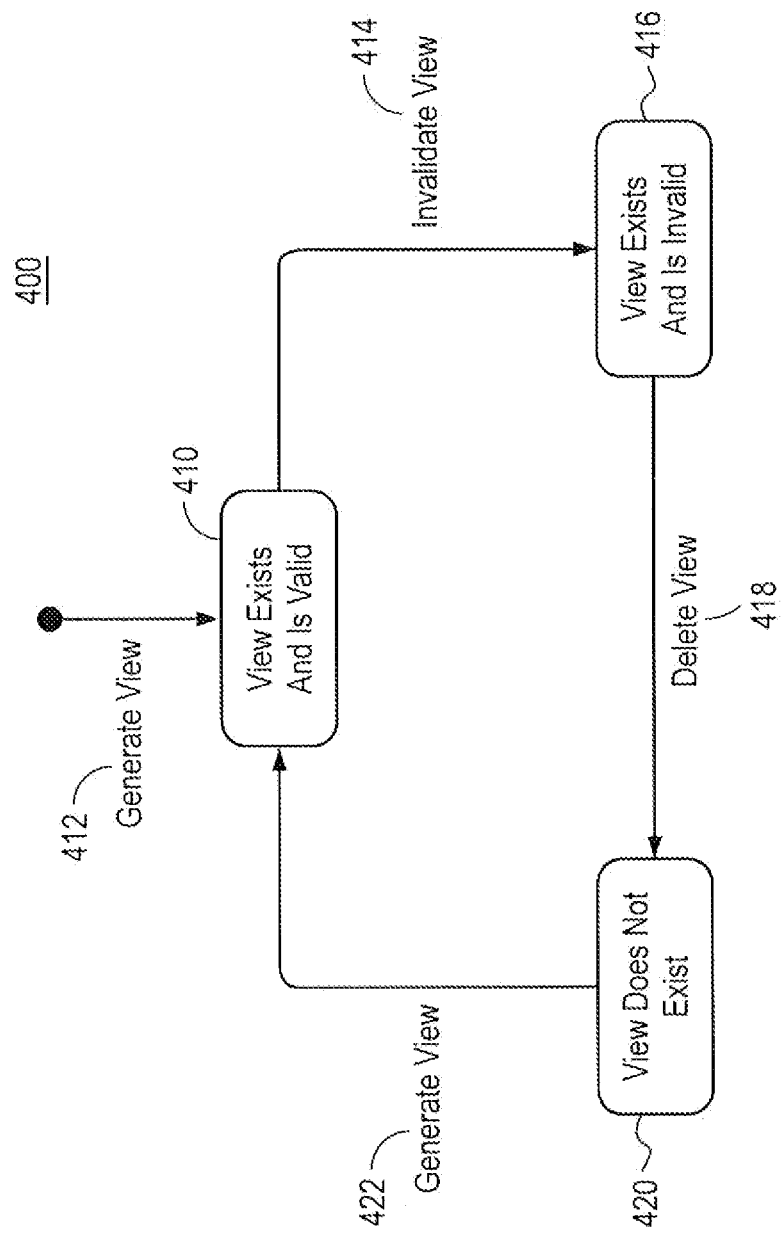
FIG. 4 depicts a process flow for managing the life cycle of views.

FIG. 4 depicts a process 400 for the life cycle management of the view. In some implementations, the life cycle management of a view in the context of a query may include one or more of the following: determining whether a view should be generated (410), generating a view (412), invalidating and/or deleting an obsolete view (416-418), and re-generating a view (420-422).

To determine whether it is necessary to generate a view, a check may be made during run time to determine whether a view exists (410). For example, the shared memory manager 310 may check the view/query execution run time 350 and/or shared memory 200 to determine whether a view exists. Once a view exists, the view is initially assumed to be valid.

To generate a view when it does not exist, the shared memory manager 310 obtains metadata (which is required to generate the view) from the shared memory 200 and/or repository 317. Using the shared memory 200 may, in some implementations, provide fast run time access to the required metadata in shared memory 200. As such, an action can occur within a transaction, without using a so-called commit work statements (e.g., a commit work statement in the middle of a running transaction can lead to data inconsistencies).

To illustrate with an example, when a client/user side change occurs, such as a software upgrade or the deployment of customer specific extensions, the corresponding view may change, dictating thus that the view be invalidated (and/or deleted) during run time. For example, a timestamp may be used within the shared memory 200 to mark the view (and any corresponding metadata) as obsolete, which results in the view being deleted during run time.

To re-generate views, the timestamp in the shared object 200 may indicate that the view has changed. This time stamp indicator is used to access the metadata needed to generate the view.

The following provides an example based on an enterprise resource planning system (ERP) including a sales order view (e.g., a view of a business object for a sales order) included in the ERP system provided to a customer. At 412, after a system is installed, a view, such as sales order view, may be used during the daily, initial operation of the ERP system. Initially, the generation of the view is performed from the view's metadata. At 410, after the generation of the view, the view is in a state of "exists and is valid," which refers to the fact that the view can be used. At 414, a software upgrade may be installed into the ERP system, and the upgrade may include an extension of the view (e.g., the sales order view). As a result, the view is invalidated by the shared memory manager 310 since the view is no longer current (i.e., the previously generated view at 412 does not include the upgrade or extension). At 416, after the invalidation, the view is in a state of "exists and is invalid." At 418, once a view is in the state of "exists and is invalid," the view is deleted by for example the shared memory manager 310. At 420, after the deletion, the view is in a state of "does not exist." At 422, when trying to access the view in run time, the shared memory 310 determines that the view is in a state of "does not exist." As a result, the generation of the view is triggered on demand, in run time, and a new view is generated by the view/query execution run time 350 (or the view generator included in 350). In this generation phase, the new view (e.g., the sales order view) is considered to be current and ready for use in the ERP system.

Figure 5:
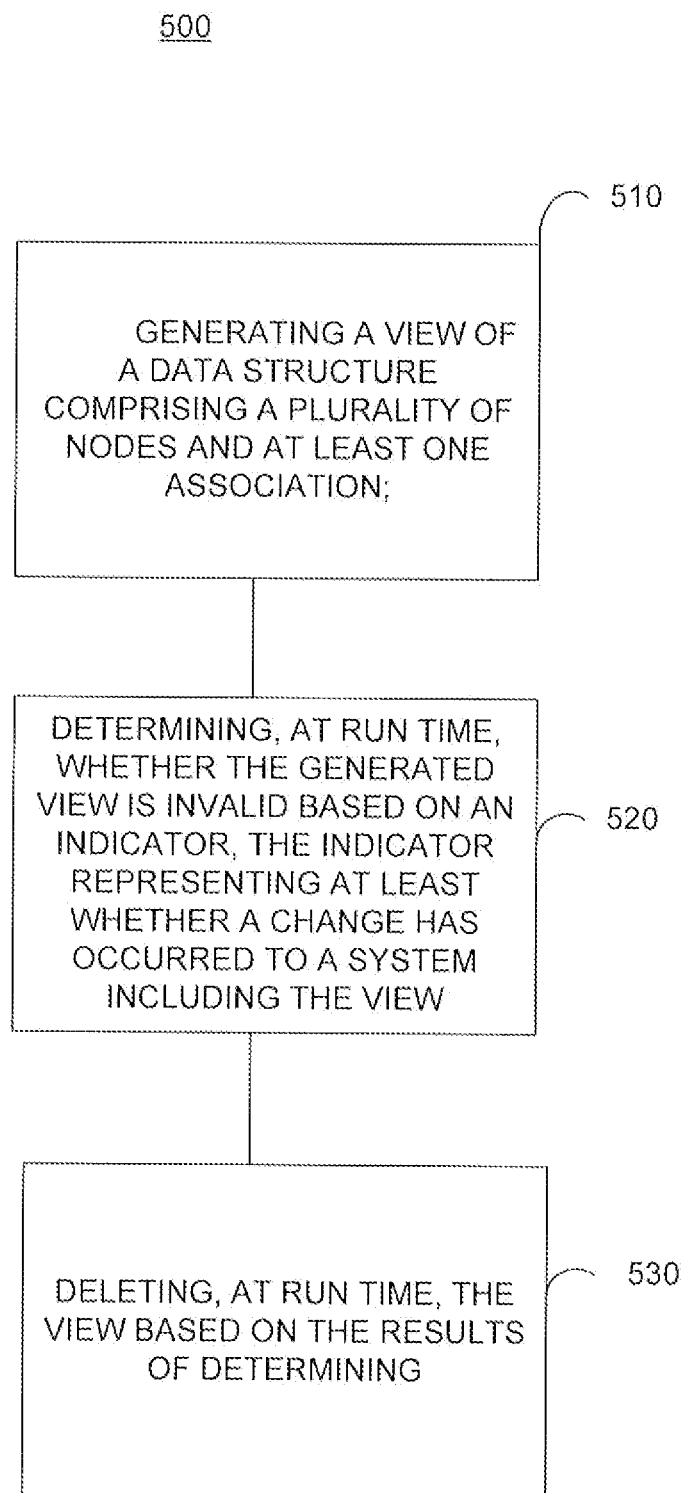
FIG. 5 depicts another process flow for managing the life cycle of views.

FIG. 5 depicts an example process 500 for managing the life cycle of views. At 510, a view is generated. For example, the view generator (which is part of the view/execution run time engine 350) may generate a view of a data structure, such as a view of a business object. The generation of the view may include accessing metadata stored in repository 317 and/or shared memory 200. The metadata may include information describing the view and/or the business object. As noted, a business object is a data structure including data and/or methods, and is typically referred to in terms of nodes and their associations.

At 520, a determination of whether the generated view is invalid is made at run time, and the determination may be based on an indicator, such as a time stamp and the like. The indication represents at least whether a change has occurred to a system including the view. For example, the change may be an upgrade, an extension, and the like to the system 300 or a component of system 300. For example, shared memory manager 310 may make the determination of whether the generated view is invalid during run time based on a time stamp of the view stored in shared memory 200. In this example, run time refers to a time period during which the query is executed.

At 530, a view may be deleted at run time based on the results of determining at 520. For example, the shared memory manager 310 may wait until run time to delete the views based on the indicator or time stamp associated by the view. Thus, the shared memory manager 310 waits until run time to manage views (e.g., delete, generate, etc.) on demand rather than manage those views during design time, such as during the installation of the upgrade/change to the system.

Figure 6:
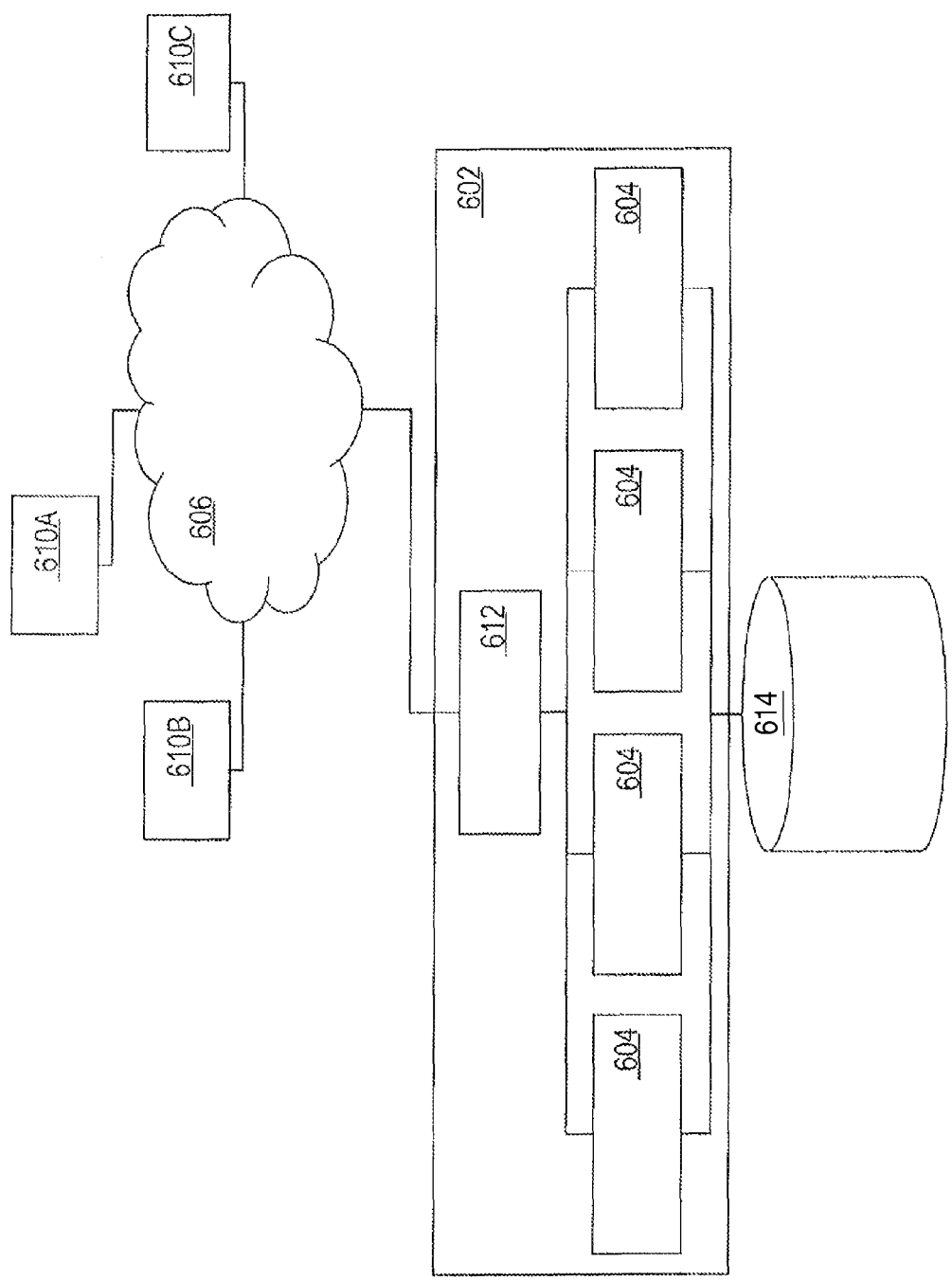
FIG. 6 depicts a block diagram of a multi-tenant system.

FIG. 6 shows a block diagram of a multi-tenant implementation of a software delivery architecture 600 that includes an application server 602, which can in some implementations include multiple server systems 604 that are accessible over a network 606 from client machines operated by users at each of multiple organizations 610A-610C (referred to herein as "tenants" of a multi-tenant system) supported by a single software delivery architecture 600. For a system in which the application server 602 includes multiple server systems 604, the application server can include a load balancer 612 to distribute requests and actions from users at the one or more organizations 610A-610C to the one or more server systems 604. A user can access the software delivery architecture across the network using a thin client, such as for example a web browser or the like, or other portal software running on a client machine. The application server 602 can access data and data objects stored in one or more data repositories 614.

Figure 7:
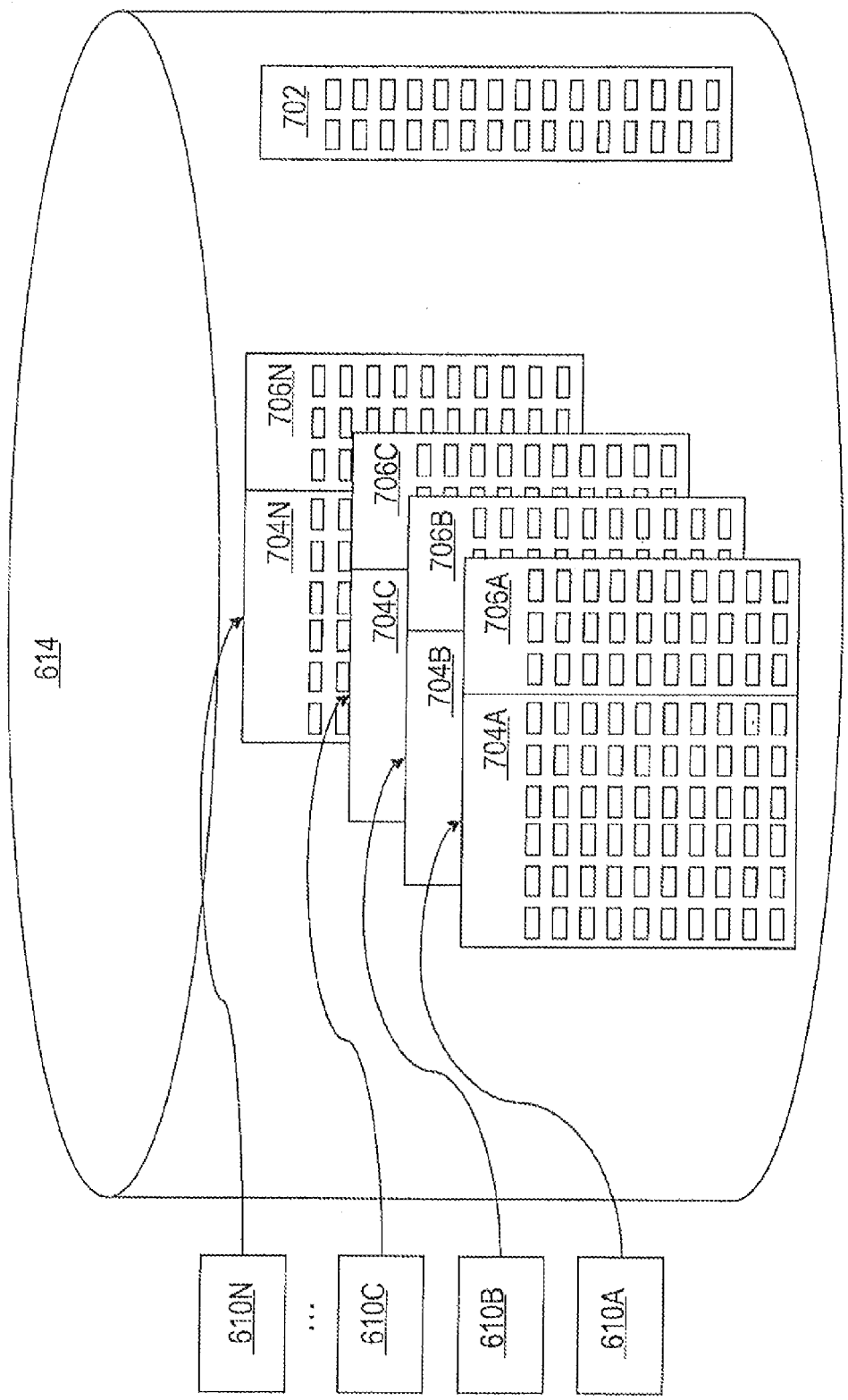
FIG. 7 depicts core and client specific content in a multi-tenant system.

To provide for customization of the core software platform for each of multiple organizations supported by a single software delivery architecture 600, the data and data objects stored in the repository or repositories 614 that are accessed by the application server 602 can include three types of content as shown in FIG. 7: core software platform content 702, system content 704, and tenant content 706. Core software platform content 702 includes content that represents core functionality and is not modifiable by a tenant, such as a client. Core software platform content 702 and system content 704 may be shared by a plurality of tenants (e.g., clients). In this example, business object and views (and/or changes to business objects and/or views) related to core software platform content 702 and system content 704 may be stored in shared memory 200.

System content 704 can in some examples be created by the run time of the core software platform and can include core data objects that are modifiable with data provided by each tenant. For example, if the core software platform is an ERP system that includes inventory tracking functionality, the system content 704A-704N can include data objects for labeling and quantifying inventory. The data retained in these data objects are tenant-specific (e.g., specific to a client): for example, each tenant 610A-610N stores information about its own inventory. Tenant content 706A-706N includes data objects or extensions to other data objects that are customized for one specific tenant 610A-610N to reflect business processes and data that are specific to that specific tenant and are accessible only to authorized users at the corresponding tenant. Such data objects can include a key field (for example "client" in the case of inventory tracking) as well as one or more of master data, business configuration information, transaction data, or the like. For example, tenant content 706 can include condition records in generated condition tables, access sequences, price calculation results, or any other tenant-specific values. A combination of the software platform content 702 and system content 704 and tenant content 706 of a specific tenant are presented to users from that tenant such that each tenant is provided access to a customized solution whose data are available only to users from that tenant.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a hack-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN")., and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description makes references to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A non-transitory computer-readable medium containing instructions to configure at least one processor to perform operations comprising:
   generating a view of a data structure comprising a plurality of nodes and at least one association;
   invalidating, at run time, the view when a change to the data structure has occurred following the generating of the view, the change comprising at least one of an upgrade to the data structure or a modification of the data structure;
   marking a time stamp associated with the invalid view to indicate that the invalid view is obsolete; and
   deleting, at run time, the invalid view based on the time stamp.

2. The non-transitory computer-readable medium of claim 1, wherein the view represents the data structure, wherein the at least one association comprises a join, and wherein the view is configured to be mapped to at least one query parameter for querying the data structure.

3. The non-transitory computer-readable medium of claim 1, further comprising:
   generating, at run time, another view to replace the invalid view, when the invalid view is deleted at run time.

4. The non-transitory computer-readable medium of claim 1, wherein a plurality of views and a plurality of data structures are stored in shared memory.

5. The non-transitory computer-readable medium of claim 1, wherein the data structure is stored in a first portion of shared memory when the data structure corresponds to a specific tenant and in a second portion of shared memory when the data structure corresponds to multiple tenants.

6. A method comprising:
   generating a view of a data structure comprising a plurality of nodes and at least one association;
   invalidating, at run time, the view when a change to the data structure has occurred following the generating of the view, the change comprising at least one of an upgrade to the data structure or a modification of the data structure;
   marking a time stamp associated with the invalid view to indicate that the invalid view is obsolete; and
   deleting, at run time, the invalid view based on the time stamp.

7. The method of claim 6, wherein the view represents the data structure, wherein the at least one association comprises a join, and wherein the view is configured to be mapped to at least one query parameter for querying the data structure.

8. The method of claim 6 wherein at least one of the generating, the invalidating, the marking, and the deleting are implemented in at least one processor.

9. The method of claim 6, further comprising:
   generating, at run time, another view to replace the invalid view, when the invalid view is deleted at run time.

10. The method of claim 6, wherein a plurality of views and a plurality of data structures are stored in shared memory.

11. The method of claim 6, wherein the data structure is stored in a first portion of shared memory when the data structure corresponds to a specific tenant and in a second portion of shared memory when the data structure corresponds to multiple tenants.

12. A system comprising:
at least one processor; and
at least one memory including code which when executed provides operations comprising:
generating a view of a data structure comprising a plurality of nodes and at least one association;
invalidating, at run time, the view when a change to the data structure has occurred following the generating of the view, the change comprising at least one of an upgrade to the data structure or a modification of the data structure;
marking a time stamp associated with the invalid view to indicate that the invalid view is obsolete; and
deleting, at run time, the invalid view based on the time stamp.

13. The system of claim 12, wherein the view represents the data structure, wherein the at least one association comprises a join, and wherein the view is configured to be mapped to at least one query parameter for querying the data structure.

14. The system of claim 12, wherein at least one of the generating, the invalidating, the marking, and the deleting are implemented in the at least one processor.

15. The system of claim 12, further comprising:
generating, at run time, another view to replace the invalid view, when the invalid view is deleted at run time.

16. The system of claim 12, wherein a plurality of views and a plurality of data structures are stored in shared memory.

* * * * *